(12) United States Patent
Smyth et al.

(10) Patent No.: US 6,697,342 B1
(45) Date of Patent: Feb. 24, 2004

(54) CONFERENCE CIRCUIT FOR ENCODED DIGITAL AUDIO

(75) Inventors: Joseph Smyth, Galway (IE); David O'Connell, Galway (IE)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/411,284

(22) Filed: Oct. 4, 1999

(30) Foreign Application Priority Data

Jun. 30, 1999 (GB) ............................................. 9915312

(51) Int. Cl.[7] .......................... H04L 12/16; H04Q 11/00
(52) U.S. Cl. ....................... 370/260; 370/261; 370/262; 370/263; 709/204; 348/14.08; 348/14.09; 348/14.13; 379/202.01; 455/416
(58) Field of Search ................................. 370/260–263; 709/204; 348/14.08, 14.07, 14.01, 14.09, 14.05, 14.13; 381/106, 108, 104; 333/14; 379/202.01; 455/416

(56) References Cited

U.S. PATENT DOCUMENTS

| | | | | |
|---|---|---|---|---|
| 5,727,075 A | * | 3/1998 | Aoyagi | 381/106 |
| 5,914,747 A | * | 6/1999 | Hamilton | 348/14.058 |
| 6,125,343 A | * | 9/2000 | Schuster | 704/201 |
| 6,222,881 B1 | * | 4/2001 | Walker | 375/240.03 |
| 6,466,550 B1 | * | 10/2002 | Foster et al. | 370/260 |
| 6,535,521 B1 | * | 3/2003 | Barghouti et al. | 370/462 |

* cited by examiner

Primary Examiner—Wellington Chin
Assistant Examiner—Chuong Ho
(74) Attorney, Agent, or Firm—Barnes & Thornburg

(57) ABSTRACT

A conference system is provided for connection in a digital audio signal transmission system (50), for receiving N encoded audio signals from N conferees, wherein N is a positive integer greater than or equal to three. The system comprises a decoding system (90, 91, 92) for decoding the N audio signals, a selection system (100, 130) for selecting one from the N decoded audio signals, and means for switching (160) the selected encoded audio signal from an input stage (80, 81, 82) of the conference circuit to an output (161) of the conference circuit, for transmission at least to the N−1 conferees from whom the selected audio signal did not originate. This arrangement enables the audio from one conferee to be provided as the conference signal, without undergoing decoding and subsequent re-encoding. A decision is made as to whether one signal is appropriate or whether multiple audio signals should be combined.

22 Claims, 2 Drawing Sheets

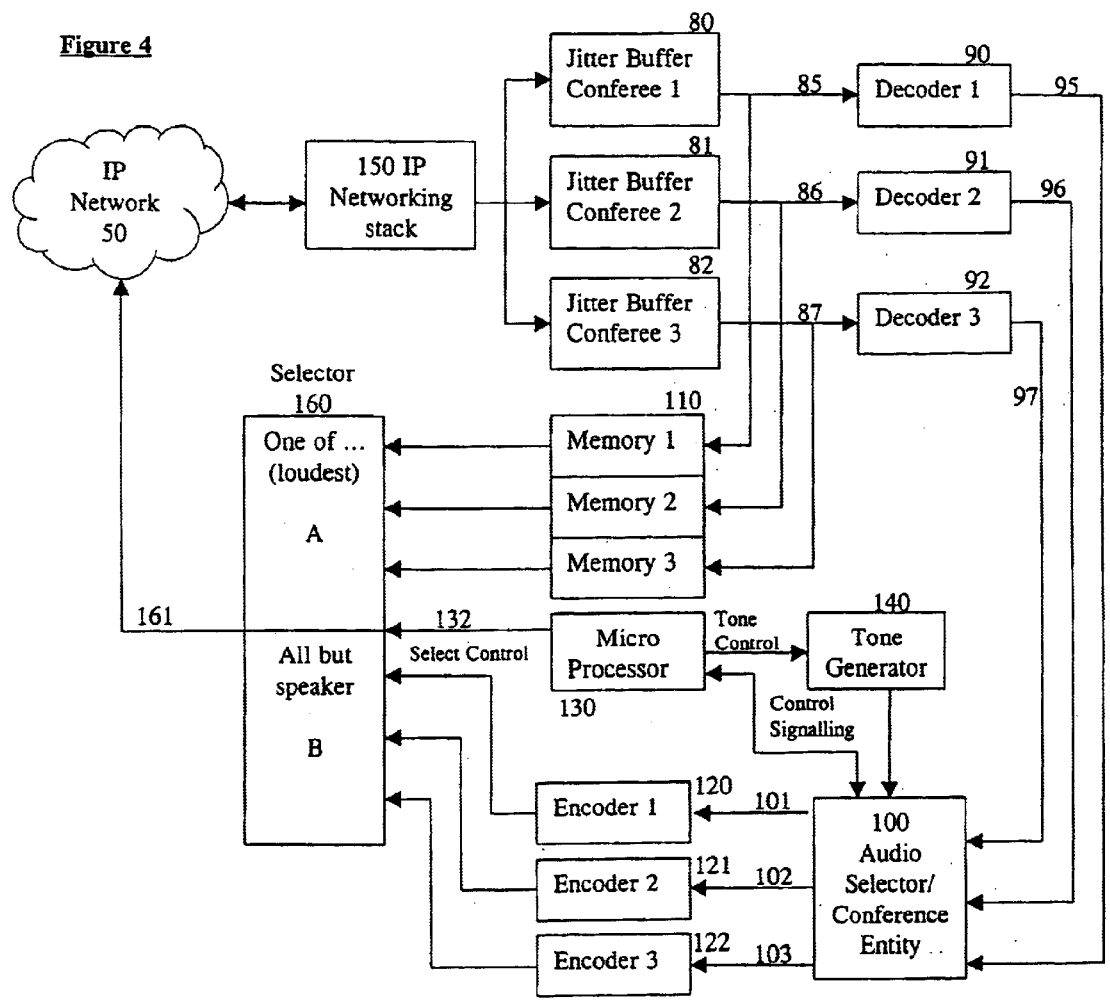

CONFERENCE CIRCUIT FOR ENCODED DIGITAL AUDIO

FIELD OF THE INVENTION

This invention relates to conferencing circuits, and more particularly to conference circuits for connection in a digital audio signal transmission system for the transmission of encoded audio data. Such conference circuits may be used in conventional telephony, or in voice over Internet Protocol audio transmission, or for the handling of audio data for video conferencing facilities.

BACKGROUND OF THE INVENTION

Conferencing circuits are well known in the field of telephony. In general terms, a conference circuit enables three or more participants (or conferees) to talk to one another at the same time. Early conference circuits, employed in analogue telephone systems, provided conferencing by summing all the signals of all the participants and transmitting this resultant signal to all the conferees, with the exception of the talker who receives the resultant signal minus his own signal.

A known approach to conferencing with digital techniques involves converting the digital signals back to the analogue domain, performing an analogue conferencing function, and then re-converting the resultant analogue conference signal into a digital signal. Converting to analogue and re-converting to digital of course adds distortion to the signals involved. It is therefore preferred to perform the summing of signals directly within the digital domain. However, since the digital signals are generally not linear, but rather are encoded using nonlinear pulse code modulation (PCM), it has been proposed to first linearise the digital signals before the subsequent combination of signals, and then re-code those signals, but remaining in the digital domain.

U.S. Pat. No. 4,224,688 describes a digital conference circuit in which the audio signals from a number of conferees are combined directly in PCM format to obtain signals to be provided to the various participants of the conference.

In recent years, increasingly efficient encoding algorithms have been developed for encoding digital audio for transmission across networks, in order to reduce the bandwidth requirements of the network carrying the signals, for example in Voice over IP applications. Generally, these additional encoding algorithms give rise to some degradation of the quality of the voice signal due to the loss of information inherent in lossy compression algorithms. Various standards have evolved concerning the compression of voice data, for example the ITU G.729 voice compression standard which is applicable to video conferencing systems, and the ITU G.723.1 high compression ratio standard. Numerous other standards exist for different system requirements. Generally, these compression techniques are lossy and are very non-linear in nature, so that an analysis of the encoded data does not immediately reveal useful information concerning the sample which has been encoded.

Therefore, conferencing circuits for processing encoded digital audio conventionally decode the encoded voice stream back to the original format, for example to conventional PCM format, to enable comparison of the original signals so that the conferencing functions can be performed. The output of the conference circuit then needs to be re-encoded so that it provides a suitable input to the individual audio devices of the network (for example telephones or computers). The introduction of the conferencing circuit therefore gives rise to additional decoding and encoding, and with lossy compression techniques this so-called "double encoding" can give rise to a serious reduction in signal quality. This problem arises because the existing conference algorithms can only work in the linear domain for mixing the multiple voice streams.

SUMMARY OF THE INVENTION

According to the present invention, there is provided a conference system for connection in a digital audio signal transmission system, for receiving N encoded audio signals from N conferees, wherein N is a positive integer greater than or equal to three, the system comprising:
  a decoding system for decoding the N audio signals;
  a selection system for selecting one from the N decoded audio signals;
  a switching system for switching the selected encoded audio signal from an input stage of the conference system to an output of the conference system, for transmission at least to the N−1 conferees from whom the selected audio signal did not originate.

In the conference system of the invention, decoding of the multiple input signals only needs to be performed to enable the desired comparison of the audio signals to be carried out by an audio selector. Once one audio signal has been selected, the encoded audio signal from an input side of the conference system can be routed to the output without any intermediate decoding and re-encoding, as carried out in the prior art. By "an input stage" is meant a part of the conference circuit where the input signals have not yet passed through a decoding stage.

As one example, the selection circuit may comprise means for measuring the volume of the decoded audio signals, so that a signal strength measurement dictates which audio signals are provided to the conferees.

These features of the invention enable a single audio signal to be selected for transmission to all participants of the conference (apart from the originator of the audio signal).

However, the circuit may additionally comprise a conferencing entity for combining selected ones of the decoded audio signals;
  an encoding unit for re-encoding the combined decoded audio signals; and
  means for switching the combined re-encoded audio signal to the output of the conference system, to be used in place of the single audio signal selected previously, for a period.

This additional feature enables a combination of audio signals to be provided to the participants of the conference, when this is appropriate. A control unit is preferably provided for determining whether a combination of re-encoded signals or a single encoded signal is appropriate, and this determination may be based on the relative volumes of the audio signals. For example, if there is a dialogue between two participants simultaneously and with approximately equal volume (for example an argument) it will be appropriate for all participants to hear both of these parties.

Informational tones (such as conference warning tones or barge-in tones, indicating that an operator has joined the call) or other tones would also require to be conferenced to all parties. A tone generation system may therefore provide data to the selection system for this purpose. The features above enable the conference system to revert to a conventional approach in such circumstances, whereas during the majority of the conference proceedings, a single audio signal may be provided to the participants, which has not been subjected to decoding and re-encoding.

To perform the functions described above, the control unit preferably comprises means for determining the audio signal with the greatest volume, and for measuring the volume difference between that audio signal and the remaining audio signals, which will be combined by the conference entity, and passed to the output if the volume difference between the two signals of greatest volume is below a threshold.

The invention also provides a method of providing a conference facility for N conferees communicating over a digital audio signal transmission system, wherein N is a positive integer greater than or equal to three, the method comprising:

providing encoded audio signals from the N conferees to a conference system;

decoding the N audio signals;

selecting at least one of the audio signals by analysing the N decoded audio signals, wherein if only one audio signal is selected, the encoded audio signal for the selected signal is switched to the output of the conference system and transmitted to at least the N−1 conferees from whom the selected audio signal did not originate.

As described above, the step of selecting at least one audio signal may be based on the volume of the signals, and the relative volumes will dictate whether a single audio signal is switched to the output of the conference circuit or whether a combination of signals, having undergone decoding and subsequent re-encoding, is instead provided to the output.

There are, of course, various alternatives to conference algorithms based on volume determination, and these may equally be employed.

BRIEF DESCRIPTION OF THE DRAWINGS

The invention will now be described by way of example, with reference to the accompanying drawings, in which:

FIG. 4 shows in greater detail the conference system of the invention.

DETAILED DESCRIPTION

The conference circuit of the present invention will first be described in general terms with reference to one example of an IP Telephony system to which the invention may be applied.

Figure 1:
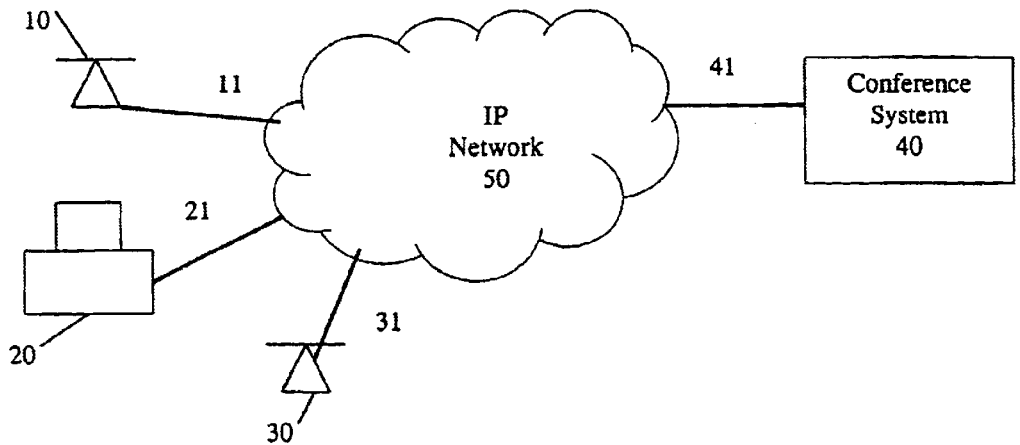
FIG. 1 shows a simplified block diagram of a IP telephony system using a conference system of the invention, for a three party conference.

FIG. 1 depicts three IP telephony terminals, IP Telephones (telsets) 10, 30 and an IP Telephony enabled Personal Computer 20, which are employed by three conferees, one conferee per terminal. Although a conference system for IP telephony communication is described with reference to FIG. 1, the invention may equally be applied to any audio encoded using "lossy" encoding algorithms, which must be conferenced.

The IP Network 50 is any standard Internet Protocol based network that would serve to interconnect any of the telephony terminals 10, 20 and 30. The IP Networking Stack 150 (Ref. FIG. 4) is any standard Internet Protocol stack of which many are commercially available. A detailed description of the IP Network 50 or the IP Networking Stack 150 is not required for an understanding of the present invention, and their operation will not be described further. Indeed, this invention may be applied equally to any form of network over which audio encoded using "lossy" encoding algorithms, which must be conferenced, is carried.

Figure 2:
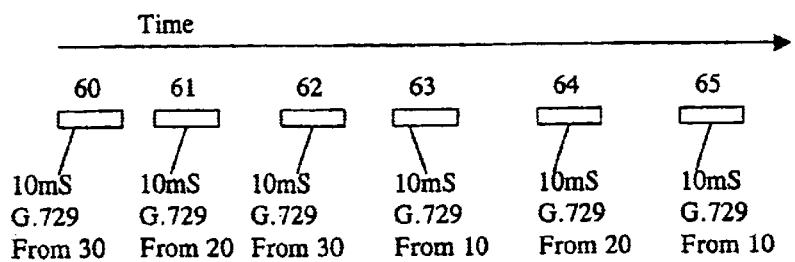
FIG. 2 shows the input audio packet stream to the Conference system.

Each terminal 10, 20 and 30 converts the analogue signal that it receives from the transducer into which the conferee speaks into an encoded packet stream, each packet (FIG. 2 60–65) containing a number of milliseconds of encoded audio. The compression encoding enables the bandwidth requirements for the network to be kept to a minimum. These packets are transmitted via the IP Network 50 to the conference system 40. The packet stream arriving via IP Network connection 41 to the Conference System 40 is shown in FIG. 2.

Compression encoding is increasingly being used, and these compression algorithms are typically lossy in nature. Various compression standards exist for audio data, as set out in the International Telecommunications Union (ITU) standards. Currently the best known of these algorithms are G.729, G.729A and G.723.1. G.729 is a high performance voice compression standard approved by the ITU in November 1995. It is also called CS-ACELP (Conjugate-Structure Algebraic Code Excited Linear Prediction). In order that CS-ACELP be approved as a standard by the ITU, the coder had to meet stringent requirements and objectives such as toll quality under clean channel conditions, robust performance in the presence of random bit errors and detection of erased frames. Subjective testing was performed in many languages in laboratories throughout the world (BNR, CNET, CSELT, DTA and NTT). Speech frame sizes of 10 ms are used, corresponding to 80 samples at 8000 samples per second.

The G.729 Annex B details the VAD (Voice Activity Detection) and CNG (Comfort Noise Generation) algorithms, collectively referred to as DTX (Discontinuous Transmission), for G.729 and G.729A CODECs. Annex-A represents a reduced-complexity version of G.729. Both versions are fully compatible with each other, however, G.729A requires considerably less processing power to implement. G.723.1 is another speech compression algorithm that is standardized by the ITU. It specifies dual coding rates at 5.3 and 6.3 kilobits per second (Kbps). G.723.1 was originally created by AudioCodes and others for the ITU-T speech coding standard for PSTN videotelephony and video conferencing. It is the mandatory speech coder for Visual Telephony over GSTN and mobile radio. G.723.1 is also specified as an optional speech coder for Visual Telephony over ISDN, B-ISDN, guaranteed QoS LAN, non-guaranteed QoS LAN, Voice over Frame Relay and Voice over IP. The G.723.1 delivers near toll quality performance at the lowest bit rate. It has two bit rates which can be changed seamlessly on a frame-by-frame basis, a unique feature among ITU low bit rate speech coders. G.723.1 Annex A details the VAD, CNG, and PLP (Packet Loss Protection) algorithms.

For IP audio communication the encoding will also include packetising of the audio data as well as compression for transmission over the IP Network 50, which uses packet based asynchronous data transmission. A block diagram of a conference system for handling IP data is shown in FIG. 4. The packets will be unpacked by the IP Networking Stack 150, and broken out into the various audio channels and reordered (since the packets may arrive in a different order).

Since IP traffic is asynchronous, any comparison of audio signals can only be made once a number of packets, corresponding to a certain time duration, have been received and reordered to define the audio signal. This is done by using a jitter buffer 80,81,82 which is a technique well known in the art. The IP Networking Stack 150 and jitter buffers 80, 81, 82 may be considered as an input stage of the conference system.

Missing packets may also be interpolated or otherwise regenerated by various techniques known in the art, such as the PLP algorithms described in G.723.1 Annex A. The correctly ordered packet streams 85,86,87 are fed into the decoder 90,91,92, where they are decoded into a form 95,96,97 in which analysis of the audio data can take place. This is usually linear or PCM format. In other words, the audio data must be decoded before any analysis can take place.

This ordered stream is also stored in packet format in memory 110, as it will be required for retransmission once the current speaker has been identified by applying the conference algorithm to the audio streams in the Audio Selector/Conference Entity 100. This is usually implemented by a DSP as are the decoder sections 90,91,92, the encoders 120,121,122 and tone generator 140.

The Conference Entity 100 applies the conference algorithm and outputs the sum of any tones currently being generated by the tone generator 140 as described above and all speakers (optionally to a maximum number) within a specified number (X) dBs of the loudest speaker. A separate output 101,102,103 is generated for each speaker conferee, which has that conferee's own audio stream subtracted from the output. This is input to the Encoders 120,121,122, one per conferee, which encodes the conferenced audio stream back into the packet format required for network transmission. Tone Generation is under control of the Micro Processor 130. The Audio Selector 100 signals back to the Micro Processor 130 if there are tones being generated and if there are any speakers within X dBs of the loudest speaker, as well as identifying the loudest speaker.

Figure 3:
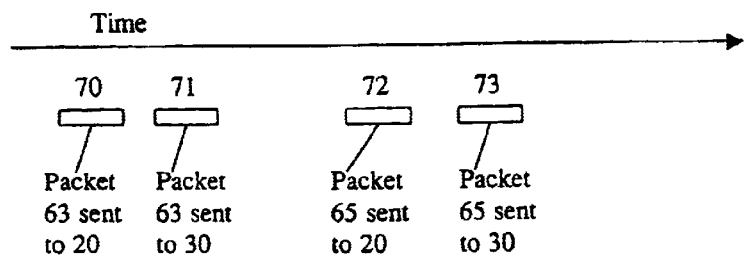
FIG. 3 shows the output audio packet stream from the Conference system.

The Micro Processor 130 uses this input to choose one of the sets of inputs A or B to the selector 160, via the select control 132, as the audio packet streams to be transmitted back to the conferees via the selector output, 161. If Input Set A is selected the Micro Processor will further select the packet stream from the loudest speaker for retransmission to all conferees except the loudest speaker. If Input Set B is selected each stream is transmitted to its intended conferee. The selector is essentially a means for switching either a selected encoded audio signal or a combined re-encoded audio signal to the output of the conference system. The Micro Processor and the selector 160 together comprise a selection system. Instead of being a physical device, the selector 160 may be implemented in software on the Micro Processor. FIG. 3 shows the resultant packet stream transmitted from the conference unit to the conferees, when there is one dominant speaker at telset 10 and no tones in progress.

This algorithm allows the best quality to be transmitted to all conferees when there is one dominant speaker, which covers most of the duration of a conference. It also allows speaker crossover periods to be correctly conveyed although with the penalty of reduced quality due to the reversion to double encoded audio paths. Tones are similarly conveyed.

The conference circuit of the invention thereby enables a single audio signal to be switched to the output of the conference unit without undergoing decoding and subsequent re-encoding. This is only possible for individual audio signals. However, the system shown in FIG. 4 also enables a combination of signals to be provided to the output using the conventional decoding and re-encoding procedure. By combining these two possibilities, it is possible to handle speaker hand-over more naturally.

In the example described above, the conference algorithm is based on the relative volumes of the different audio signals. However, other algorithms which limit the number of audio signals to be provided to the conference participants at any point in time could be used. For example, "first to speak" conference algorithms could be employed, as well as any other suitable method for selecting the signals to be provided to the different conference participants. This would not change the operation of the invention, or the advantages achieved by it.

We claim:

1. A conference system for connection in a digital audio signal transmission system, for receiving N encoded audio signals from N conferees, wherein N is a positive integer greater than or equal to three, the system comprising:
   a decoding system for decoding the N encoded audio signals into respective decoded audio signals:
   a selection system for selecting one from the N decoded audio signals by analysing the N decoded audio signals;
   a switching system for switching the encoded audio signal corresponding to the selected decoded audio signal directy from an input stage of the conference system to an output of the conference system, for without any decoding and re-encoding, transmission at least to the N−1 conferees from whom the selected audio signal did not originate.

2. The conference system according to claim 1, further comprising a tone generation system, which provides data to the selection system.

3. The conference system according to claim 1, wherein the selection system comprises means for measuring the volume of the decoded audio signals.

4. The conference system according to claim 1, wherein the digital audio transmission system is VoIP (Voice over Internet Protocol).

5. The conference system according to claim 1, wherein the encoding of the audio signals is using any of G729, G729A, G729AB, G723.1 voice compression standards.

6. The conference system according to claim 1, wherein the encoding of the audio signals is in any compression format in which a double encode/decode leads to loss of audio quality.

7. The conference system according to claim 1, wherein the digital audio transmission system transports digital audio data synchronously.

8. The conference system according to claim 1, further comprising:
   a conference entity for combining selected ones of the decoded audio signals;
   an encoding unit for re-encoding the combined decoded audio signals, and
   a switching system for switching the combined re-encoded audio signal to the output of the conference system.

9. The conference system according to claim 8, wherein a control unit is provided for determining whether the combination of re-encoded signals or the single encoded signal is provided to the output of the conference circuit.

10. The conference system according to claim 9, wherein the determination is based on the relative volumes of the audio signals.

11. The conference system according to claim 10, wherein the control unit comprises circuitry for determining the audio signal with the greatest volume, and for measuring the volume difference between that audio signal and the remaining audio signals, the conference entity being operated to couple the two signals with greatest volume, to the output, if the volume difference between the two signals of greatest volume is below a threshold.

12. A method of providing a conference facility for N conferees communicating over a digital audio signal transmission system, wherein N is a positive integer greater than or equal to three, the method comprising:

providing encoded audio signals from the N conferees to a conference system;

decoding the N encoded audio signals into respective decoded audio signals;

selecting at least one of the N decoded audio signals by analysing the N without any decoding and re-encoding, decoded audio signals, wherein if only one decoded audio signal is selected, the encoded audio signal corresponding to the selected decoded audio signal is directly switched from an input stage of the conference system to an output of the conference system and transmitted to at least the N−1 conferees from whom the selected audio signal did not originate.

13. The method according to claim 12, wherein the step of selecting comprises measuring the volume of the decoded audio signals, and selecting the audio signal with greatest volume.

14. The method according to claim 12, wherein the encoding of the audio signals is using the G729, G.729A, G.729AB or G.723.1 voice compression standard, or any other ☐lossy☐ encoding method and the decoding step comprises decoding using that method.

15. The method according to claim 12, wherein if two or more audio signals are selected by the selecting step, then the two or more selected ones of the decoded audio signals are combined, encoded and provided to the output of the conference system.

16. The method according to claim 15, wherein the determination of whether a combination of re-encoded signals or a single encoded signal is provided to the output of the conference system is based on the relative volumes of the audio signals.

17. The method according to claim 16, wherein the determination of whether a combination of re-encoded signals or a single encoded signal is provided to the output of the conference system comprises determining the audio signal with the greatest volume, measuring the volume differences between that audio signal and the remaining audio signals, the single encoded signal of greatest volume being provided to the output of the conference system if the volume difference between the two signals of greatest volume is above a threshold, and a combination of reencoded signals being provided to the output of the conference system if the volume difference between the two signals of greatest volume is below a threshold.

18. The method according to claim 17, wherein the combination of re-encoded signals comprises the combination of the two audio signals of greatest volume.

19. A program storage device readable by a machine and encoding one or more programs of instructions for executing a method of providing a conference facility for N conferees communicating over a digital audio signal transmission system, wherein N is a positive integer greater than or equal to three, the method comprising;

providing encoded audio signals from the N conferees to a conference system;

decoding the N encoded audio signals into respective decoded audio signals;

selecting at least one of the N decoded audio signals by analysing the N decoded audio signals, wherein If only one decoded audio signal is selected, the encoded audio signal corresponding to the selected decoded audio signal is directly switched without any decoding and re-encoding, from an input stage of the conference system to an output of the conference system and transmitted to at least the N−1 conferees from whom the selected audio signal did not originate.

20. The device according to claim 19, wherein the step of selecting comprises measuring the volume of the decoded audio signals, and selecting the audio signal with greatest volume.

21. The device according to claim 19, wherein the determination of whether a combination of re-encoded signals or a single encoded signal is provided to the output of the conference system is based on the relative volumes of the audio signals.

22. The device according to claim 19, wherein the determination of whether a combination of re-encoded signals or a single encoded signal is provided to the output of the conference system comprises determining the audio signal with the greatest volume, measuring the volume differences between that audio signal and the remaining audio signals, the single encoded signal of greatest volume being provided to the output of the conference system If the volume difference between the two signals of greatest volume is above a threshold, and a combination of re-encoded signals being provided to the output of the conference system if the volume difference between the two signals of greatest volume is below a threshold.

* * * * *